Patented July 29, 1941

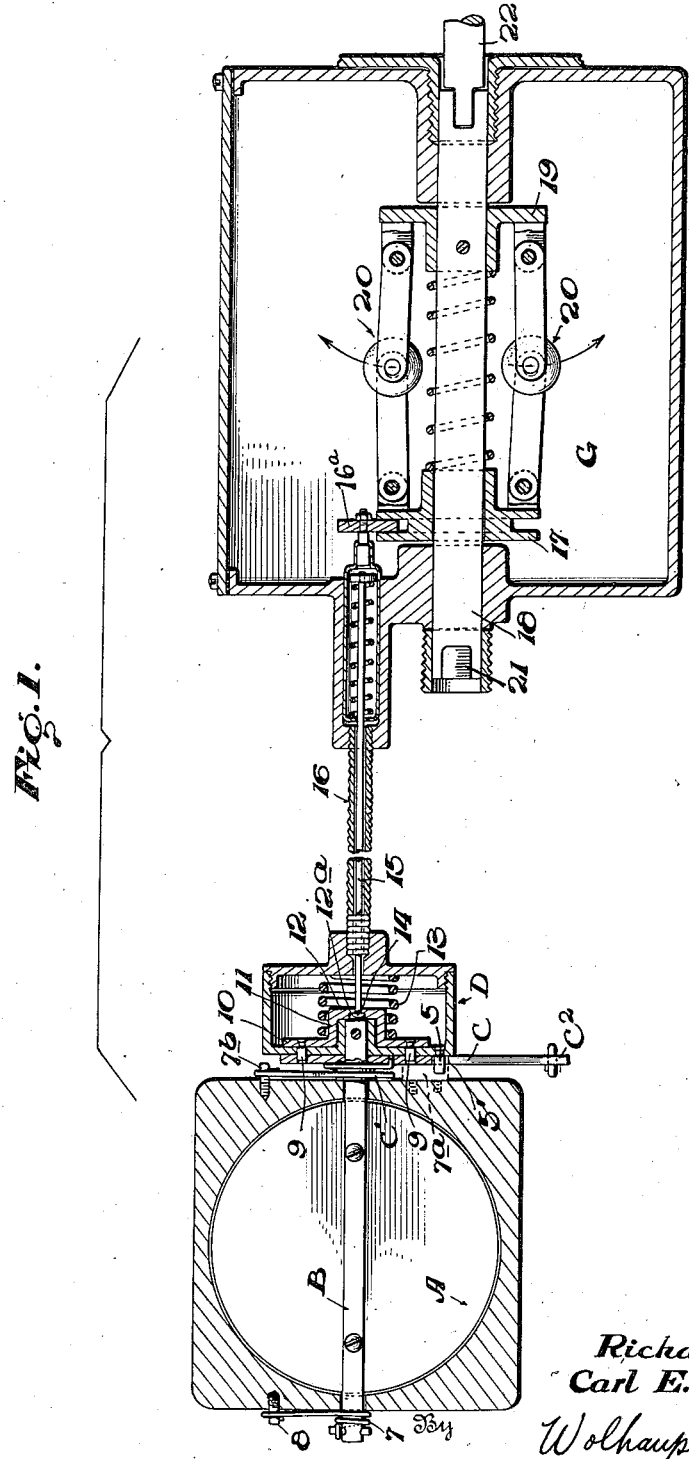

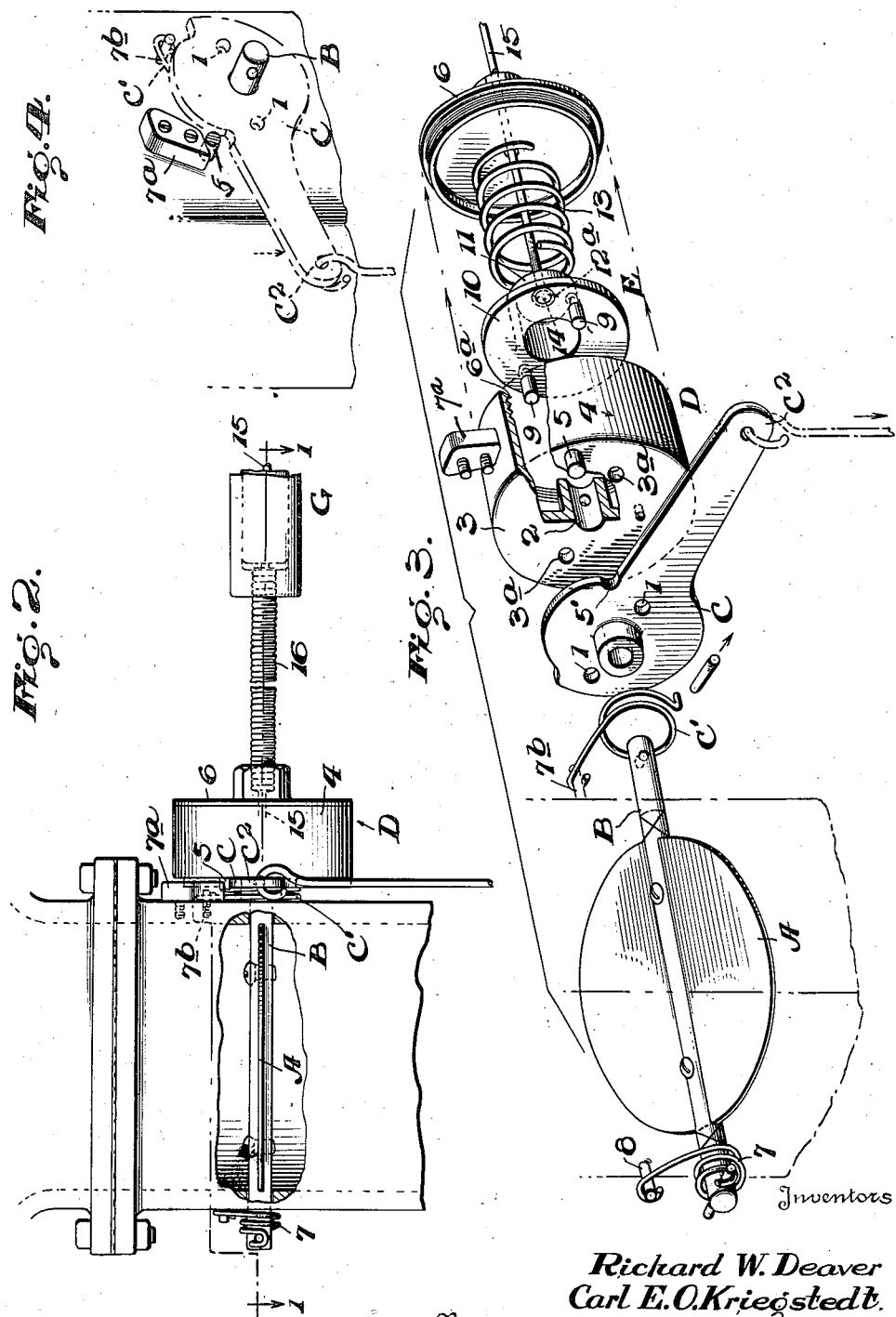

2,251,186

UNITED STATES PATENT OFFICE 2,251,186

AUTOMATIC SPEED GOVERNOR FOR AUTOMOTIVE VEHICLES

Richard W. Deaver and Carl E. O. Kriegstedt, Washington, D. C.; said Kriegstedt assignor to said Deaver Application August 4, 1939, Serial No. 288,454

8 Claims. (Cl. 180—82.1)

This invention relates to speed governors for automobiles, and more particularly to a device controlled from, or by, the speedometer shaft which will automatically render the accelerator connections to the throttle valve of the engine of the automobile ineffective when a certain predetermined rate of travel of the vehicle has been reached and/or exceeded.

To that end, the invention contemplates a device in the nature of an automatic clutch which is normally engaged with an operating element of the accelerator connection with the engine throttle valve, under conditions which produce a speed lower than a selected rate of miles per hour, but which automatically becomes disengaged when the traveling speed of the vehicle reaches a predetermined point, and thereby causes the throttle or butterfly valve to close to the idling position and remain in such position until the speed of the vehicle drops below the predetermined limit and until the operator, having first released pressure on foot pedal, again restores such pressure. In other words, the operator of the vehicle actuates the accelerator or throttle means through a speed-controlled clutch which throws out at a selected point.

A further object of the invention is to provide a simple, practical and reliable unit which may be economically manufactured and readily installed on trucks or other vehicles in such a way as to prevent their operation at speeds greater than that at which the device is set to operate. In that connection the present invention permits the motor itself to operate at any speed thereby permitting full throttle conditions in shifing gears, climbing hills and the like.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:

Figure 1 is a diagrammatic view illustrating the application of the invention.

Figure 2 is a vertical sectional view illustrating the construction and actions of the novel clutch unit.

Figure 3 is a disassembled or exploded view of the clutch device.

Figure 4 is a fragmentary perspective view illustrating the stop means for the element of the clutch which is fixed to the throttle valve shaft and for the operator's control lever.

Similar reference characters designate corresponding parts throughout the several figures of the drawings.

In carrying the invention into effect, it is proposed to associate the present device directly or indirectly with the throttle or butterfly valve of the engine carburetor. To that end, the invention is preferably adapted for the automatic control of the usual throttle valve A having the shaft B upon which is loosely and pivotally mounted the operator's control element C. This element may be in the form of a lever or its equivalent directly under the control of the operator through the usual accelerator pedal, and this control element is intended, according to the present invention, to be normally interlocked with the present clutch device D, which in turn includes a part or a member keyed to the trottle valve shaft. That is to say, the control lever or link C which connects up directly with the usual accelerator pedal is loosely and rockably mounted on the throttle valve shaft B so that when it is interlocked, normally, with a member or part of the new clutch device D, through the keeper openings 1, it will control the position of the throttle valve A in response to movement imparted against the tension of the spring C'. It will, of course, be understood that the end C² of the said control element or lever may be and is connected in the usual way, as above stated, with the conventional accelerator pedal or a part actuated or controlled thereby.

To the throttle valve shaft B is keyed directly the sleeve portion 2 of the clutch device D, the said sleeve preferably projecting inwardly from a wall 3 of a cup-like housing member 4, said housing member, in the preferred form of the invention, being preferably closed at its outer side by a cap or cover member 6 detachably secured to the body of the housing member by a threaded connection 6ª or its equivalent, thereby completing a casing or housing for the operating parts of the clutch.

In order to provide for the spring retraction of the housing member on its axis of rotation, that may be done in several ways, but one practical form of construction for that purpose is shown in the drawings as consisting of a housing retracting spring 7 whose opposite ends are respectively connected with a point of anchorage 8 and to the shaft B. The said spring exerts its tension in a direction for drawing the rotatable housing 4 to its normal at rest position, in which position a stop lug 5 on said housing engages with a stop 7a carried by a wall of the manifold in which the valve is mounted. The control lever C, which connects with the accelerator pedal, likewise is caused to normally be drawn back to its at rest position, under the influence of its retracting spring C' whose ends are respectively connected with the lever and with a fixed point of anchorage as at 7b, and said lever may conveniently have stop-recess 5' engaging the lug 5 so that the fixed stop 7a arrests both lever and housing at the starting or at rest position. Therefore, it will be understood that the essential and practical feature involved in these details is that the control lever C and the rotatable housing member 4 are retracted, under the influence of their respective retracting springs, to the proper point (7a), so that the keeper openings 1 in the control lever C may register and receive the clutch pins or lugs of the shiftable part of the clutch as will now more particularly appear.

The wall 3 of the housing member 4 is provided with openings 3a adapted to normally register with the keeper openings 1 in the lever C, the said openings 3a being intended to hold and guide the clutch pins or lugs 9, which are always in the holes 3a in housing 4. The clutch pins or lugs 9, in the form of construction illustrated, are carried by the annular flange 10 of a speed-controlled clutch member, designated generally as E which is of a generally cup-like formation including a side wall 11 and the transverse portion or end 12. The said portion 11 of the flange member E loosely and slidably fits over the sleeve 2 secured to the throttle shaft, and is capable of angular movement relative to the sleeve when the pins or lugs 9 are withdrawn from the keeper openings 1 in the control lever C. And, for the purpose of maintaining the speed-controlled member E in its normal position, that is, in clutching engagement through its pins or lugs 9 with the control lever C, a suitable spring 13 is arranged in an operative position between the said flange 10 and the outside cap or cover 6 of the housing member.

The transverse or end wall 12 of the speed-controlled member E is provided with an opening 12a countersunk at its inner side to loosely receive the head 14 of a flexible release wire or shaft 15 which is intended to be coupled up in any suitable mechanical way with a speed governor of any conventional type, and this flexible release wire or control shaft 15 may be, and preferably is, in the form of a wire of the type ordinarily used for speedometer shafting.

For purposes of illustration one practical way of connecting the release wire or shaft 15 with the speed governor is shown in the drawings, wherein the said wire or shaft 15 is shown led through a conventional type of hollow armored housing cable, and may be connected in any suitable manner as by a stud or finger 16a loosely engaging the groove in the movable grooved collar 17 of a speed governor designated generally as G operated directly from an operating shaft 18. This operating shaft 18, as shown, carries both the movable collar 17 and the fixed collar 19 of the governor which are connected by the usual centrifugal elements 20 of the governor, said shaft 18 being conveniently connected at one end 21 in any suitable manner with the speedometer drive shafting from the vehicle wheel, and at its other end 22 with the shafting which connects with the speedometer on the dashboard. However, these details form no part of the present invention, and are merely shown for the purpose of illustrating a speed-governor hook-up for operating the automatic clutch of the present invention.

The governor G, as stated, may be of any conventional type which is capable of functioning in response to a given speed, for example, 30 miles per hour. When this speed is reached, the governor G will axially shift the flexible release shaft 15 in a direction to draw the movable clutch member E against the influence of the spring 13. In other words, when the governor reaches a predetermined speed, the shaft 15 will cause the member E to move in a direction to compress the spring 13, and to withdraw the clutch pins or lugs 9 from the keeper openings 1 in the member C. This action permits the housing member of the clutch device to be free to respond to the energy of the spring 7 which returns the said housing member back to the normal or idling position, and consequently allows the speed of the vehicle to drop. As the speed of the vehicle drops below a given rate in miles per hour, the governor G will return to normal position and the shaft 15 will be released from the influence of the governor thereby permitting the member E to again thrust the pins or lugs 9 outwardly of the wall 3, for reengagement in the openings in the control lever C, the holes 1 of which, after the operator has released pressure on accelerator pedal, are in register with the holes 3a in housing 4 by reason of the control lever C and housing 4 each having been brought back to motor-idling position by their respective springs. It may also be pointed out that as soon as the pins or lugs 9 are withdrawn from the openings 1, the housing member 4 will be turned back to normal position by the spring 7 so that when the lever C is retracted by the spring C', to motor-idling position by release of foot pressure on accelerator pedal, it and the housing member 4 are then both in normal position. Thus the control lever C and the clutch device D are reengaged so that the operator will then again have control of the lever from the accelerator pedal.

From the foregoing, it will be apparent that the present invention contemplates a speed-controlled clutch device which is normally engaged with the carburetor throttle control means. However, when the vehicle speed reaches a predetermined point, the clutch device will become automatically operative to disengage the throttle control member so that the same will be automatically returned to its zero setting by a spring which is beyond the control of the operator's effort to further increase the speed of the vehicle by pushing on the accelerator controls. Immediately after such automatic disengagement, upon dropping of the speed of the vehicle and release of foot pressure on accelerator pedal, all parts return to their normal position. Then the operator of the vehicle will be able to regain control of the speed of the vehicle up to the predetermined point.

I claim:

1. A speed governor for automotive vehicles, including the combination with the engine throttle valve shaft, of an operator's control lever loosely mounted on said throttle valve shaft, a clutch device including a fixed member fast on the throttle valve shaft and a movable clutch member having elements releasingly engaging both the fixed clutch member and said operator's control lever, and speedometer controlled governor means for actuating the said movable member of the clutch device to disengage and release the control lever when a predetermined vehicle speed is attained.

2. A speed governor for automotive vehicles, including the combination with the engine throttle valve shaft, of an operator's control lever spring retracted and loosely mounted on the throttle valve shaft, a clutch device including a fixed clutch member fast on the throttle valve shaft and rotatable therewith under spring tension in one direction, and a movable clutch member having elements releasably engaging both the fixed clutch member and said operator's control lever, and speedometer controlled governor means actuating the movable clutch member to disengage and release the control lever when a predetermined vehicle speed is attained.

3. A speed governor for automotive vehicles, including the combination with the engine throttle valve shaft, of a fixed stop element, a spring retracted operator's control lever loosely mounted on the said shaft and adapted to engage said stop element, a clutch device having a housing member fast to the shaft of the throttle valve and provided with a stop projection adapted to cooperate with and engage both said fixed stop element and the operator's control lever, and a movable clutch member having clutch pins releasably engaging both the fixed clutch member and said operator's control lever, and speedometer controlled governor means connected with and actuating the movable clutch member to disengage and release the control lever when a predetermined vehicle speed is attained.

4. A speed governor for automotive vehicles, including in combination with the engine throttle valve and its shaft, a spring-retracted operator's control lever loosely mounted on the throttle valve shaft, a clutch device including a housing member arranged at one side of said control lever and secured to the throttle valve shaft, spring means for urging rotary movement of said housing member, in one direction, stop means for limiting the rotary movement of both the operator's control lever and said housing member, a spring-pressed and normally engaged movable clutch member operating within said housing and having clutch elements releasably engaging both said housing member and said operator's control lever, and speedometer-controlled governor means for actuating the movable clutch member in one direction to release its engagement with the parts referred to when a predetermined vehicle speed is attained.

5. In a motor vehicle, an engine throttle valve, a shaft on which said valve is mounted and which is rotatable to open and close said valve, a driver-actuated member mounted loosely with respect to said shaft for rotation about the same, clutch means on said shaft normally connecting said driver-actuated member with said shaft so that said throttle valve normally is under the control of said driver-actuated member, means operable in response to the speed of the vehicle exceeding a predetermined rate to actuate said clutch means to disconnect said driver-actuated member from said shaft, thereby to deny control of the throttle valve by said driver-actuated member, and means for closing said throttle valve when said driver-actuated member is disconnected from said shaft.

6. In a motor vehicle, an engine throttle valve, a shaft on which said valve is mounted and which is rotatable to open and close said valve, yieldable means tending constantly to rotate said shaft to close said valve, a clutch element fixed to said shaft for rotation therewith, a driver-actuated member loose with respect to said clutch element, a second clutch element rotatable with said first mentioned clutch element and movable with respect thereto to connect and disconnect said driver-actuated member with and from said first mentioned clutch element, means normally holding said second mentioned clutch element in a position connecting said driver-actuated member with said first mentioned clutch element so that said throttle valve normally is under the control of said driver-actuated member, and means operable in response to the speed of the vehicle exceeding a predetermined rate to actuate said second mentioned clutch element to disconnect said driver-actuated member from said first mentioned clutch element, thereby to deny control of said throttle valve by said driver actuated member and to permit closing of the throttle valve by said yieldable means.

7. In a motor vehicle, an engine throttle valve, a shaft on which said valve is mounted and which is rotatable to open and close said valve, a driver-actuated member mounted loosely with respect to said shaft for rotation about the same and having a normal position corresponding to a closed position of said valve, clutch means on said shaft normally connecting said driver-actuated member with said shaft so that said throttle valve normally is under the control of said driver-actuated member, means operable in response to the speed of the vehicle exceeding a predetermined rate to actuate said clutch means to disconnect said driver-actuated member from said shaft, thereby to deny control of the throttle valve by said driver-actuated member, means for closing said throttle valve when said driver-actuated member is disconnected from said shaft, and means for actuating said clutch means to reestablish the connection between said driver-actuated member and said shaft when said driver-actuated member is returned to its normal position following its disconnection from said shaft.

8. In a motor vehicle, an engine throttle valve, a shaft on which said valve is mounted and which is rotatable to open and close said valve, yieldable means tending constantly to rotate said shaft to close said valve, a clutch element fixed to said shaft for rotation therewith, a driver-actuated member loose with respect to said clutch element and said shaft and rotatable about said shaft and having a normal position corresponding to a closed position of said valve, a second clutch element rotatable with said first mentioned clutch element and movable with respect thereto to connect and disconnect said driver-actuated member with and from said first mentioned clutch element, means normally holding said second mentioned clutch element in a position connecting said driver-actuated member with said first mentioned clutch element so that said throttle valve is under the control of said driver-actuated member, means operable in response to the speed of the vehicle exceeding a predetermined rate to actuate said second mentioned clutch element to disconnect said driver-actuated member from said first mentioned clutch element, thereby to deny control of said throttle valve by said driver-actuated member and to permit closing of said throttle valve by said yieldable means, yieldable means and cooperating stop means whereby said valve is moved to a closed position and said first mentioned clutch element is moved to a definite position when said driver-actuated member is disconnected from said first mentioned clutch element, and means to reestablish the connection between said driver-actuated member and said first mentioned clutch element when said first mentioned clutch element is in its said definite position and said driver-actuated member is returned to its normal position, thereby to again place the throttle valve under the control of said driver-actuated member.

RICHARD W. DEAVER.
CARL E. O. KRIEGSTEDT.